A. J. MEYER.
VEHICLE WHEEL.
APPLICATION FILED AUG. 19, 1912.
1,261,839.
Patented Apr. 9, 1918.
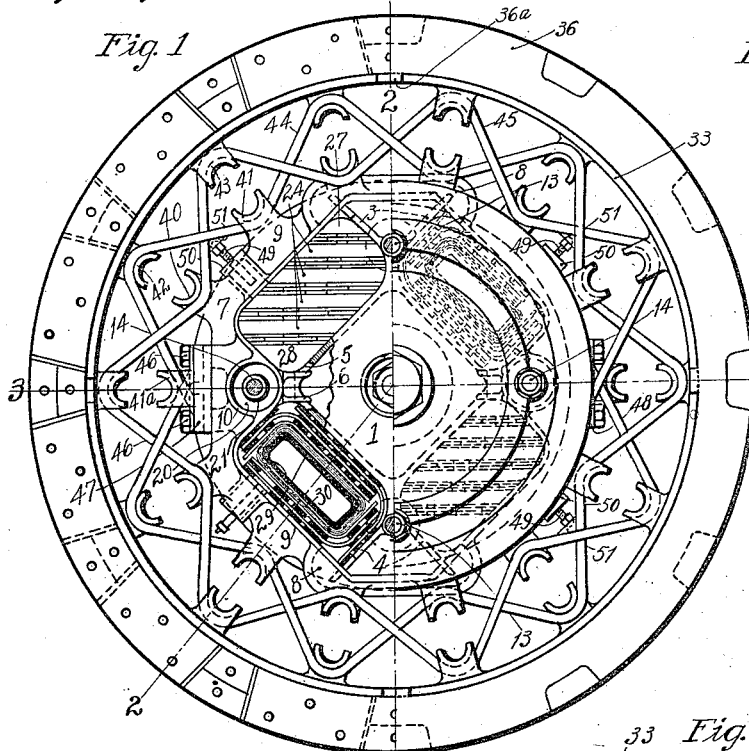
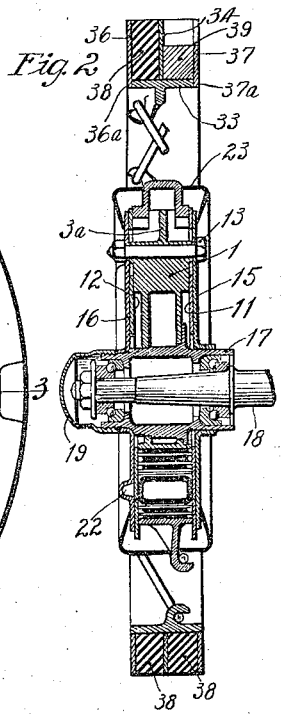
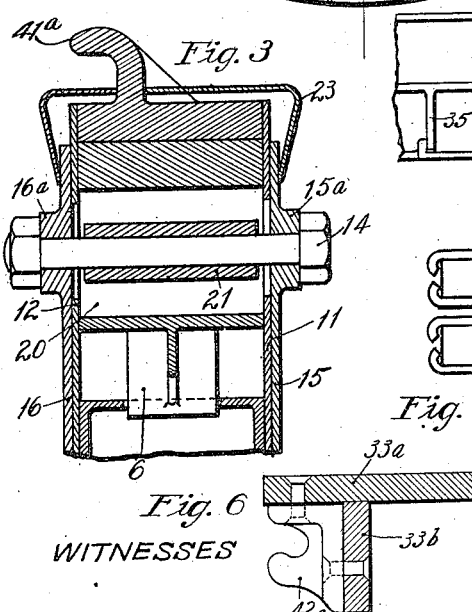
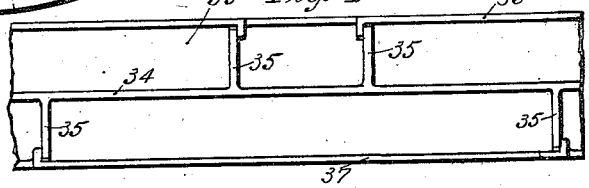
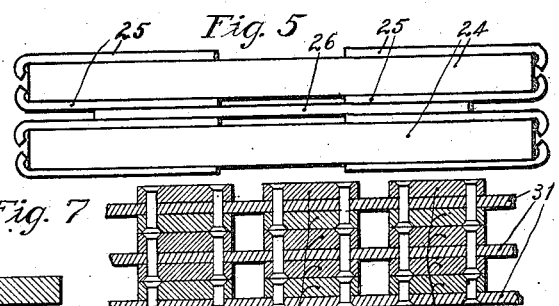
WITNESSES
INVENTOR.
August J. Meyer.
BY
ATTORNEYS

UNITED STATES PATENT OFFICE.

AUGUST J. MEYER, OF CHICAGO, ILLINOIS, ASSIGNOR TO A. J. MEYER MOTOR CAR COMPANY, OF CEDARBURG, WISCONSIN, A CORPORATION OF WISCONSIN.

VEHICLE-WHEEL.

1,261,839.  Specification of Letters Patent.  Patented Apr. 9, 1918.

Application filed August 19, 1912. Serial No. 715,717.

*To all whom it may concern:*

Be it known that I, AUGUST J. MEYER, a citizen of the United States, residing at Chicago, in the county of Cook and State of Illinois, have invented a certain new and Improved Vehicle-Wheel, of which the following is a full, clear, concise, and exact description, reference being had to the accompanying drawings, forming a part of this specification.

My invention relates to an improved form of vehicle wheel in which resilient cushions are employed for receiving the shock communicated to the wheel when in use, as a result of which the shock is absorbed and not communicated to the axle supporting the wheel. My invention consists in an improved construction of resilient cushion for use in a wheel of the kind under consideration, as well as the devices supporting the cushions.

A further object of my invention consists in the mechanical construction of vehicle wheels, such that the spokes commonly used heretofore in wheel constructions are entirely eliminated and cables are used instead for supporting the rim of the wheel from the central portion thereof. My invention also involves details of construction which will best appear from the following drawings, in which—

Figure 1 is an elevation of the wheel, one-half of which shows the outside parts of the wheel construction, while in the other half the inclosing plates of the central portion of the wheel are removed to show the cushioning construction.

Fig. 2 is a sectional view taken along the line 2—2 in Fig. 1.

Fig. 3 is an enlarged transverse sectional view of a portion of the central or cushion supporting part of the wheel, this view being taken along the line 3—3, as shown in Fig. 1.

Fig. 4 is an edge view of a portion of the tread of the wheel showing the conformation of the rim.

Fig. 5 is an enlarged view of one form of resilient cushion which may be employed in the wheel.

Fig. 6 is a cross-sectional view of a modified form of rim construction.

Fig. 7 shows in enlarged cross-section a construction of protecting devices which may be employed in connection with the resilient cushions.

Similar numerals refer to similar parts throughout the several views.

As shown in Figs. 1, 2, and 3, the wheel consists of a central portion composed of a rectangular hollow frame 1, having outwardly extending arms 3 and 4 for engaging the cushions. These arms, together with the outer surface of the hollow frame, constitute the support for one edge and one end of each of the cushions employed, and the arms 3 and 4 are reinforced by webs extending between them, as indicated for the arms 3 in Fig. 2 at 3ª. At the angles of the hollow frame between the oppositely projecting arms 3 and 4, openings 5 are made to receive the projections 6 extending inward from the outer member 7 of the cushion support. This outer member 7 is so conformed that it is provided with bearing surfaces, one for one edge and one end of each of the resilient cushions. The member 7 has two opposite and outwardly extending compartments 8 formed upon it between the opposite inwardly extending arms 6 to receive the outwardly extending arms 3 formed on the frame 1, which arms 3 are of reduced width where they enter these compartments. Except as reduced at the ends of the arms 3 and 4, the frame 1 and flanges 9 and 10 formed on the member 7 are of the same width so that the cover-plates 11 and 12 engage both the frame 1 and the member 7, thus forming a tight closure between these two parts. The arms 6 are of reduced width where they enter the openings 5 for a similar reason. The plates 11 and 12 are provided with clearance openings around the bolts 13 and 14, so that they may float freely upon the sides of the frame 1 and the flanges 9 and 10, these plates being held in place by outer plates 15 and 16 securely held in place by the bolts 13 and 14.

The frame 1 is rigidly secured to a hub 17 provided with ball-bearings, as indicated, by which the wheel is mounted upon the axle 18. The plates 15 and 16 are rigidly secured to the hub 17 by means of the flanges formed on them, as indicated. The outer end of the hub and axle are inclosed by a screw-cap 19, as indicated in Figs. 1 and 2. Each of the bolts 14 is surrounded by a clearance opening 20 in the member 7 and a loose roller 21 is mounted upon each of said bolts to relieve the friction when, through relative motion of the frame 1 and member 7, the roller comes in contact with the inside of the clearance hole 20. The plates 15 and 16 have formed thereon, around each of the bolts 14, bosses 15$^a$ and 16$^a$ to distribute the strain exerted upon the bolts over a considerable surface of the plates 15 and 16, so as to prevent binding of the plates upon the floating plates 11 and 12. Thus, the bolts 14 serve to hold the plates 15 and 16 securely against the plates 11 and 12 without preventing the free motion of these plates 11 and 12 as the frame 1 and member 7 are displaced relatively to each other. The frame 1 is extended around each of the bolts 13, as indicated in Fig. 2, so as to support the plates 15 and 16 and thus these bolts 13 serve, not only to hold the plates 15 and 16 in position against the floating plates 11 and 12, but they also serve to securely clamp the plates 15 and 16 to the frame 1. The outer plate 16 is provided with an angular recess 22 for containing lubricant to facilitate the free action of the plate 16 upon the floating plate 12.

From the above description, it will appear that the frame 1, the member 7, and the plates 11 and 12 coöperate to form rectangular compartments for receiving the resilient cushions, the walls of the compartments being so related to each other that when the compartments are filled with resilient cushions, so as to cause the bolts 14 to occupy central positions in the clearance holes 20, a blow may be communicated to the frame 7 at any point and in any direction and be received by the resilient cushions without the possibility of communicating the blow directly to the frame 1 and, thus, to the axle 18. The joints between the member 7 and the edges of the plates 11 and 12, 15 and 16 are protected by an angular dust-guard 23, having inturned flanges tightly engaging the outer surfaces of the plates 15 and 16 near their peripheries. The upper wall of the dust-guard 23 has openings formed in it closely fitting the projecting parts extending outward from the member 7 and this dust-guard may be made in any desired manner, it being immaterial whether it is made in two or more pieces, and the guard may be secured to the member 7 in any desired manner, so that dirt will not enter the joints between the plates and the member 7.

The cushions may consist of any desired resilient material which has sufficient rigidity to support the load placed upon it. In Fig. 1 there is shown the preferred arrangement of cushions for general service, although it will be understood that that arrangement may be modified for any special service as desired. While in practice it will be found desirable to use different forms of cushion for different purposes, it is generally satisfactory to provide the wheels with cushioning devices consisting partly of one type of cushion and partly of another, so that the wheel may be adapted to be employed for general purposes regardless of whether the service is heavy or light. To this end, I have shown the wheel in the drawings as provided with cushions, consisting of a plurality of thicknesses of resilient material 24 made of rubber or similar material, separated from each other by friction plates, as more clearly indicated in Fig. 5. As shown in this figure, each thickness of resilient material 24 has secured to it upper and lower metallic plates 25, while, between these metallic plates, additional separating plates 26 are employed, the surfaces of which are prepared so as to move freely upon the plates 25. As a result of this construction, the plates 25 being secured to the resilient material move with it and any distortion in the shape of the cushion as a whole is produced by sliding the plates 25 and 26 relatively to each other. In this way all of the wear resulting from the distortion of the cushions is communicated to metal wearing plates, preferably of steel, and the life of the resilient material is much prolonged, since it is subject only to the compression and expansion resulting from changes in pressure upon it. It will be noticed that the strips of resilient material 24 are placed obliquely across the compartment for receiving the cushion. This arrangement is used so that a blow exerted in any direction upon the member 7 will compress the resilient strips and communicate, at least, a considerable part of the resilient displacement of the cushion to the metal wearing plates. Filler blocks 27 and 28 are used at opposite corners of the compartment to fill the space and hold the resilient material and wearing plates in place, these blocks serving to prevent the parts forming the cushion from entering the openings between the frame 1 and the member 7.

In connection with the cushion, as above described, I find it desirable also to employ one or more pneumatic cushions, consisting of an inner wall 29 of soft practically pure india rubber surrounded by several thicknesses of protecting canvas 30. The pneumatic cushion thus formed is surrounded by wearing plates, as best illustrated in Fig. 7. As shown in this figure, alternate strips of relatively stiff fabric 31 are provided with wearing blocks 32 of metal, preferably steel, although any good wearing material may be employed, these blocks being riveted to the fabric, as indicated, in such a position that the smooth outer surfaces of the blocks rest against each other. These strips of fabric, with their attached wearing blocks, are disposed, as indicated in Fig. 1, so that the inner strips rest against the protecting canvas of the pneumatic cushion, while the wearing blocks of the outer strips rest against the surfaces of the frame 1 and the member 7. Each strip extends preferably around one side and one end of the cushion and, as a result of this construction, for any displacement of the frame 1 relatively to the member 7, the metal blocks 32 are slid upon each other, the strips of fabric 31 yielding somewhat if necessary to accommodate this movement. The pneumatic cushion is provided with a tube and valve for filling the same in a manner common in pneumatic tire construction. As a result of this construction, it is impossible for any chafing to occur at the surface of the cushion and the only strain to which the pneumatic cushion is subjected is that resulting from a compression and expansion of its parts.

The rim of the wheel consists of a circular flange 33 which has formed on it an outwardly extending flange 34, having transversely extending partitions 35 at intervals, which partitions extend alternately in opposite directions from the flange 34. The flange 34 and partitions 35 coöperate with the rings 36 and 37, when the latter are put in place on the rim, to form pockets for receiving the wearing blocks 38, which are preferably of hard fibrous material, as vulcanized fiber, or hardwood. These blocks are held in place by rivets extending through the flange 34 and rings 36 and 37. The rings 36 and 37 have formed upon them tongues 36ª and 37ª, which enter corresponding notches in the portion 33 so that there will be no possibility of displacement angularly of the rings 36 and 37 relatively to the rest of the rim. From the drawings, it will be noted that the alternate disposition of the partitions 35 and the fact that these partitions are located at unequal distances from each other results in the formation on each side of the alternate flanges 35 of compartments of unequal size. Of these, the larger ones are filled with the wearing blocks 38, while the smaller ones are but partly filled with wearing blocks 39 of hard fiber or wood, the outer portion of the rings 36 and 37 being cut away down to the outer surface of these blocks 39. This construction is for the purpose of affording small pockets in the wearing surface of the tire for facilitating the engagement of the wheel with a slippery surface, since they afford a ready means for engaging any irregularities or unevennesses in the roadbed.

The member 7 has formed upon it at regular intervals a plurality of hooks 40 and 41, alternate ones of which face one side of the wheel, while the intermediate ones face the other side thereof and these hooks are somewhat nearer the face of the wheel which they face than the other face of said wheel. Similar hooks 42 and 43 are formed on the inner surface of the rim of the wheel and project inwardly opposite the hooks 40 and 41. These hooks are for the purpose of supporting cables 44 and 45 by which the rim of the wheel is held in proper position relatively to the central member 7. The cable 44 has its ends secured around the hook 41ª under the bolts 46 which pass through the clamping plate 47 into the member 7 and thus constitute a retaining and tightening clamp for the cable 44. The cable 45 is similarly held in place and tightened by means of the clamping plate 48. The hooks for receiving the cables 44 and 45 are sufficiently close together so that they will receive the load supported by the wheel to advantage, and the alternate displacement of the hooks toward opposite faces of the wheel gives the cables such a disposition that they advantageously prevent displacement of one portion of the wheel relatively to the other in a direction longitudinal of the axis of the wheel. Wear upon the cables 44 and 45 may be taken up by means of the bolts 49, threaded in the bosses 50 formed on the member 7. These bolts 49 engage at their outer ends the saddle pieces 51 conformed to engage the cables 44 and 45 at points of crossing so that when the saddle pieces are moved outward by means of the bolts, both cables are stretched, as a result, and the slack resulting from wear may be taken up until there is sufficient so that the bolts 49 may be turned into the bosses 50 and the entire slack taken up by the clamping plates 47 and 48. Suitable jam nuts may be used to hold the bolts 49 in any desired position.

In Fig. 6, I have shown a modified construction of rim in which the hooks projecting inwardly therefrom, instead of being cast integral with the rim as is indicated in Figs. 1 and 2, are riveted thereto and to a stiffening flange ring mounted inside of the rim, which flange ring is separate from the tubular ring of the rim. In the construction shown in Figs. 1 and 2, the reinforcing flange ring extending inward from the rim is shown as cast integral with the rim. In this modified construction, the ring 33ª is provided with a reinforcing ring 33ᵇ fitting inside thereof, these parts being pivoted together, as indicated, through the means of the hooks 42ª having flanges formed thereon to receive the rivets. The hooks 42ª are thus secured in place by the rivets and also serve by means of them to hold the parts 33ª and 33ᵇ together. For many constructions, this modified arrangement is desirable, since the hooks are sufficiently numerous to securely hold the parts together and the construction is less difficult to make than is the cast construction.

While I have shown my invention in the particular embodiments herein described, I do not, however, limit myself to these constructions, but desire to claim any equivalents that will suggest themselves to those skilled in the art.

What I claim is:

1. In a cushion wheel, the combination of a hub, an outer member movable relatively to the hub, compartments formed between the hub and said member, elastic cushions filling said compartments, and inwardly converging wedges carried by said hub between adjacent cushions.

2. In a cushion wheel, the combination of a hub, an outer member movable relatively to the hub, compartments formed between the hub and said member, elastic cushions filling said compartments, and inwardly converging wedges carried by said hub between adjacent cushions, said member having inwardly converging wedges between adjacent cushions.

3. In a cushion wheel, the combination of a hub, an outer member movable relatively to the hub, compartments formed between the hub and said member, elastic cushions filling said compartments, inwardly converging wedges carried by said hub between adjacent cushions, and floating plates forming the side walls of the compartments.

4. In a cushion wheel, the combination of a hub, an outer member movable relatively to the hub, compartments formed between the hub and said member, elastic cushions filling said compartments, inwardly converging wedges carried by said hub between adjacent cushions, said member having inwardly converging wedges between adjacent cushions, and floating plates forming the side walls of the compartments.

5. In a cushion wheel, the combination of a hub, an outer member movable relatively to the hub, compartments formed between the hub and said member, elastic cushions filling said compartments, inwardly converging wedges carried by said hub between adjacent cushions, floating plates forming the side walls of the compartments, circular plates outside of the floating plates for holding them in place, and bolts for clamping the circular plates to the hub portion, there being clearance openings through said floating plates for said bolts.

6. In a cushion wheel, the combination of a hub, an outer member movable relatively to the hub, compartments formed between the hub and said member, elastic cushions filling said compartments, inwardly converging wedges carried by said hub between adjacent cushions, said member having inwardly converging wedges between adjacent cushions, floating plates forming the side walls of the compartments, circular plates outside of the floating plates for holding them in place, and bolts for clamping the circular plates to the hub portion, there being clearance openings through said floating plates for said bolts.

7. In a cushion wheel, the combination of a hub, an outer member movable relatively to the hub, compartments formed between the hub and said member, elastic cushions filling said compartments, inwardly converging wedges carried by said hub between adjacent cushions, floating plates forming the side walls of the compartments, circular plates outside of the floating plates for holding them in place, bolts for clamping the circular plates to the hub portion, there being clearance openings through said floating plates for said bolts, and anti-friction rollers on said bolts.

8. In a cushion wheel, the combination of a hub, an outer member movable relatively to the hub, compartments formed between the hub and said member, elastic cushions filling said compartments, inwardly converging wedges carried by said hub between adjacent cushions, said member having inwardly converging wedges between adjacent cushions, floating plates forming the side walls of the compartments, circular plates outside of the floating plates for holding them in place, bolts for clamping the circular plates to the hub portion, there being clearance openings through said floating plates for said bolts, and anti-friction rollers on said bolts.

9. In a cushion wheel, the combination of a hub, an outer member movable relatively to the hub, compartments formed between the hub and said member, elastic cushions filling said compartments, inwardly converging wedges carried by said hub between adjacent cushions, floating plates forming the side walls of the compartments, circular plates outside of the floating plates for holding them in place, bolts for clamping the circular plates to the hub portion, there being clearance openings through said flating plates for said bolts, and a dirt guard inclosing the outer edges of the circular plates.

10. In a cushion wheel, the combination of a hub, an outer member movable relatively to the hub, compartments formed between the hub and said member, elastic cushions filling said compartments, inwardly converging wedges carried by said hub between adjacent cushions, said member having inwardly converging wedges between adjacent cushions, floating plates forming the side walls of the compartments, circular plates outside of the floating plates for holding them in place, bolts for clamping the circular plates to the hub portion, there being clearance openings through said floating plates for said bolts, and a dirt guard inclosing the outer edges of the circular plates.

11. In a cushion wheel, the combination of a hub, an outer member movable relatively to the hub, compartments formed between the hub and said member, elastic cushions filling said compartments, inwardly converging wedges carried by said hub between adjacent cushions, floating plates forming the side walls of the compartments, circular plates outside of the floating plates for holding them in place, and bolts for clamping the circular plates to the hub portion, there being clearance openings through said floating plates for said bolts, one of the plates having a recess for containing lubricant for the floating plates.

12. In a cushion wheel, the combination of a hub, an outer member movable relatively to the hub, compartments formed between the hub and said member, elastic cushions filling said compartments, inwardly converging wedges carried by said hub between adjacent cushions, said member having inwardly converging wedges between adjacent cushions, floating plates forming the side walls of the compartments, circular plates outside of the floating plates for holding them in place, and bolts for clamping the circular plates to the hub portion, there being clearance openings through said floating plates for said bolts, one of the plates having a recess for containing lubricant for the floating plates.

13. A cushion for a wheel of the class described, comprising a plurality of thicknesses of resilient material, protecting metal shoes for each thickness of material, and sliding plates of metal between the protecting plates.

14. In combination, a cushion receptacle, a plurality of thicknesses of resilient material, protecting metal shoes for each thickness of material, and sliding plates of metal between the protecting plates, said thicknesses being of unequal length so as to lie obliquely across the cushion receptacle.

15. A cushion for a cushion wheel, comprising a plurality of thicknesses of resilient material and sliding metal plates for protecting said thicknesses.

16. In combination, a cushion receptacle, a plurality of thicknesses of resilient material of unequal length so as to lie obliquely across the receptacle, and sliding metal plates for protecting said thicknesses of material.

17. In a cushion wheel, the combination of a hub, an outer member movable relatively to the hub, said hub and outer member forming compartments between them, inwardly converging wedge arms projecting from the outer member and hub between said compartments, each arm forming the end walls of adjacent compartments, and resilient cushions in the compartments.

18. In a cushion wheel, the combination of a hub, an outer member movable relatively to the hub, said hub and outer member forming compartments between them, inwardly converging wedge arms projecting outwardly from the hub between said compartments, each arm forming the end walls of adjacent compartments, and resilient cushions in the compartments.

19. In a cushion wheel, the combination of a hub, an outer member movable relatively to the hub, compartments formed between the hub and said outer member, opposite walls of said compartment being carried by the hub and said member respectively, resilient cushions filling said compartments and inwardly converging end walls between the ends of adjacent cushions whereby radial motion relatively between said outer member and said hub moves said end walls to compress adjacent cushions.

20. In a cushion wheel, the combination of a hub, an outer member movable relatively to the hub, compartments formed between the hub and said outer member, opposite walls of each compartment being carried by the hub and said member, respectively, and resilient cushions in said compartments, adjacent ones of said walls extending outwardly from said hub and diverging outwardly from each other to simultaneously compress adjacent cushions.

21. In a cushion wheel, the combination of a hub, an outer member movable relatively to the hub, compartments formed between the hub and said outer member, opposite walls of each compartment being carried by the hub and said member, respectively, and resilient cushions in said compartments, said hub carrying two outwardly converging walls of adjacent compartments and two outwardly diverging walls of said adjacent compartments.

22. In a cushion wheel, the combination of a hub, an outer member movable relatively to the hub, compartments formed between the hub and said outer member, opposite walls of each compartment being carried by the hub and said member, respectively, and resilient cushions in said compartments, said hub having outwardly diverging wedge sections constituting a portion of the walls of adjacent compartments.

23. In a cushion wheel, the combination of a hub, an outer member movable relatively to the hub, compartments formed between the hub and said outer member, opposite walls of each compartment being carried by the hub and said member, respectively, and resilient cushions in said compartments, half of the walls of each compartment being carried by the hub and half of said walls being carried by said member, the wall sections between adjacent cushions constituting outwardly diverging wedge sections.

24. In a cushion wheel, the combination of a hub, an outer member movable relatively to the hub, compartments formed between the hub and said outer member, opposite walls of each compartment being carried by the hub and said member, respectively, and resilient cushions in said compartments, adjacent walls of adjacent compartments constituting outwardly diverging wedge sections.

25. In a cushion wheel, the combination of a hub, an outer member movable relatively to the hub, compartments formed between the hub and said outer member, opposite walls of each compartment being carried by the hub and said member, respectively, and resilient cushions in said compartments, the walls of said compartments carried by said hub constituting alternating outwardly converging and diverging wedge sections between adjacent cushions.

26. In a cushion wheel, the combination of a hub, an outer member movable relatively to the hub, compartments formed between the hub and said outer member, opposite walls of each compartment being carried by the hub and said member, respectively, and resilient cushions in said compartments, the walls of said compartments carried by said outer member constituting alternating outwardly convering and diverging surfaces in engagement with adjacent cushions.

27. In a cushion wheel, the combination of the hull, an outer member movable relatively to the hub, compartments formed between the hub and said outer member, opposite walls of each compartment being carried by the hub and said member, respectively, and resilient cushions in said compartments, the walls of said compartments carried by said hub constituting alternating outwardly converging and diverging wedge sections between adjacent cushions, and the walls of said compartments carried by said outer member constituting alternating outwardly converging and diverging surfaces disposed in engagement with adjacent cushions.

28. In a cushion wheel, the combination of a hub, an outer member movable relatively to the hub, compartments formed between the hub and said outer member, opposite walls of each compartment being carried by the hub and said member, respectively, and resilient cushions in said compartments, the walls of said compartments carried by said hub constituting alternating outwardly converging and diverging wedge sections between adjacent cushions, and the walls of said compartments carried by said outer member constituting alternating outwardly converging and diverging surfaces disposed in engagement with adjacent cushions, the central lines of the diverging wedge sections of said hub being substantially in line radially with the bisecting lines of the converging surfaces of said member.

29. In a cushion wheel, the combination of a hub, an outer member movable relatively to the hub, compartments formed between the hub and said outer member, opposite walls of each compartment being carried by the hub and said member, respectively, and resilient cushions in said compartments, the walls of said compartments carried by said hub constituting alternating outwardly converging and diverging wedge sections between adjacent cushions, and the walls of said compartments carried by said outer member constituting alternating outwardly converging and diverging surfaces disposed in engagement with adjacent cushions, the diverging wedge sections of said hub and the diverging surfaces of said member alternating between successive cushions.

30. In a cushion wheel, the combination of a hub, an outer member movable relatively to the hub, compartments formed between the hub and said outer member, opposite walls of each compartment being carried by the hub and said member, respectively, and resilient cushions in said compartments, the walls of said compartments carried by said hub constituting alternating outwardly converging and diverging wedge sections between adjacent cushions, and the walls of said compartments carried by said outer member constituting alternating outwardly converging and diverging surfaces disposed in engagement with adjacent cushions, the inner walls of said compartments being formed wholly by the converging wedge sections carried by said hub.

In witness whereof, I hereunto subscribe my name, this 15th day of August, A. D. 1912.

AUGUST J. MEYER.

Witnesses:
  ALBERT C. BELL,
  CLIFFORD C. DEWEES.

Copies of this patent may be obtained for five cents each, by addressing the "Commissioner of Patents, Washington, D. C."